April 28, 1931.   E. W. BALDWIN ET AL   1,802,998
GRAIN BEATER
Filed April 28, 1928   2 Sheets-Sheet 1

INVENTORS.
Ernest W. Baldwin,
George D. Baldwin.
BY Arthur Le Brown
ATTORNEYS.

April 28, 1931. E. W. BALDWIN ET AL 1,802,998
GRAIN BEATER
Filed April 28, 1928 2 Sheets-Sheet 2
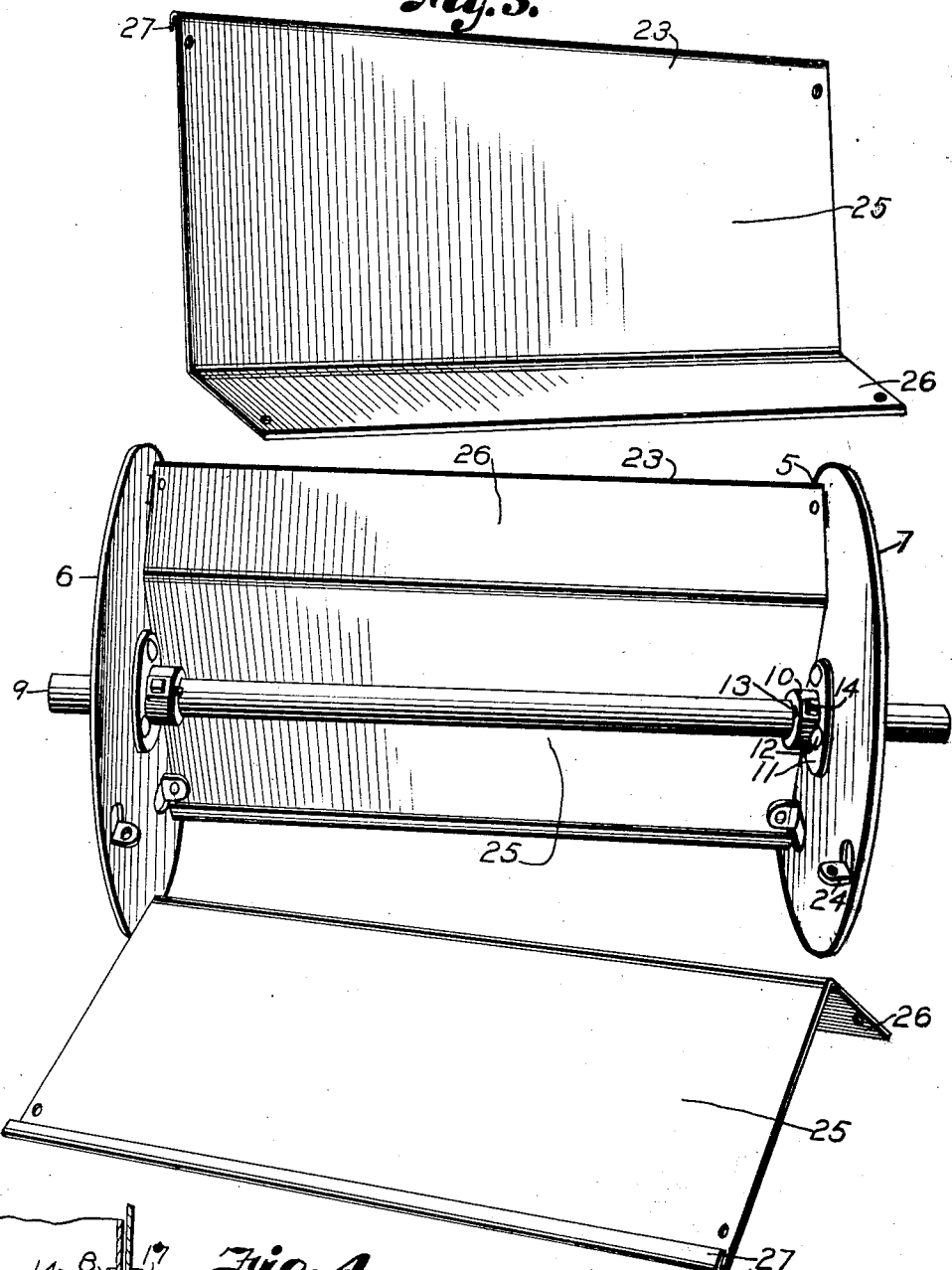
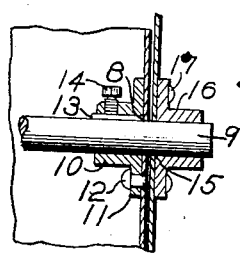
INVENTORS.
Ernest W. Baldwin.
George D. Baldwin
BY
ATTORNEYS.

Patented Apr. 28, 1931

1,802,998

UNITED STATES PATENT OFFICE

ERNEST W. BALDWIN AND GEORGE D. BALDWIN, OF INDEPENDENCE, MISSOURI, ASSIGNORS TO THE GLEANER COMBINE HARVESTER CORPORATION, OF KANSAS CITY, MISSOURI, A CORPORATION OF DELAWARE

GRAIN BEATER

Application filed April 28, 1928. Serial No. 273,663.

Our invention relates to harvesting mechanism and more particularly to grain beaters for beating the grain-containing straw moved by conveyors in harvesting mechanism, the principal object of the invention being to obviate entanglement of material by the beater.

In ordinary practice grain beaters comprise rotating blades or wings extending substantially radially from a rotating shaft positioned adjacent the straw conveyor, the rotation of the blades into and out of the moving mass of straw creating a strong draft to blow the straw ahead of the blades and prevent desired contact of the blades with the straw.

Beaters adapted to avoid excessive air disturbance have been produced, but these ordinarily are provided with spaced fingers or tines instead of imperforate blades, and the material handled, such as straw, tends to be entangled by the fingers whereby the operation of the beater is seriously hampered and impeded. Furthermore, in ordinary practice, a beater is an integral structure which must be positioned in the housing of the harvesting mechanism before complete assembly of the housing.

It is, therefore, our object to provide a beater that may be installed in a harvesting machine after the assembly thereof, and at any time, that is easily removable, that has strength combined with its removability, and that has improved functioning qualities including those of creating a minimum of air currents while avoiding entanglement of straw.

In accomplishing these and other objects of the invention we have provided improved details of structure, the preferred forms of which are illustrated in the accompanying drawings, wherein:

Fig. 3 is an enlarged perspective view of the beater, two of the blades being separated therefrom for clearer illustration.

Fig. 4 is a detail vertical sectional view of portions of the housing and beater illustrating the mounting of the beater supporting shaft.

Figure 1:
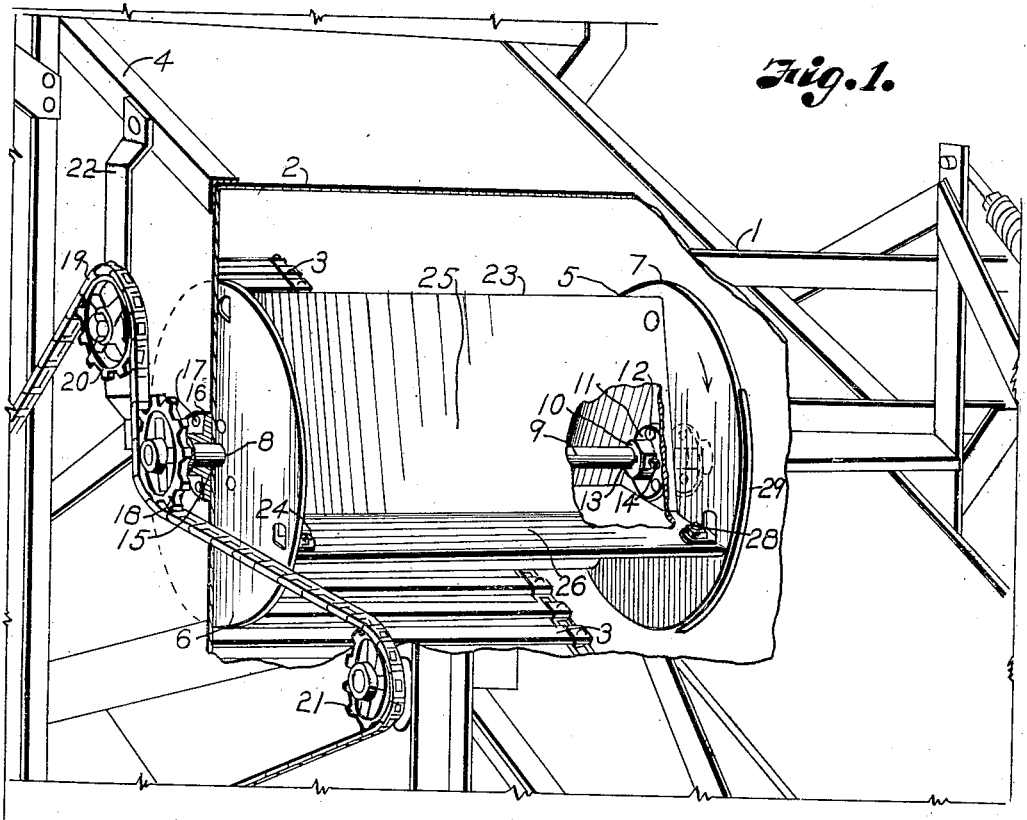
Fig. 1 is a perspective view partly in section of a portion of harvesting mechanism and our improved beater installed therein, a beating blade being partly broken away to disclose beater mounting members.

Referring in detail to the drawings:

1 designates generally a harvesting mechanism including a housing 2 in which a traveling conveyor 3 operates, and frame members such as 4 for supporting and reinforcing the housing. We provide a grain beater generally designated 5 which may be installed in the housing adjacent the conveyor at any desirable time after the assembly of the harvesting mechanism, and in any desired position in the housing.

The beater comprises spaced disks 6 and 7 having axial openings 8 to receive a shaft 9, and collars 10 slidable on the shaft provided with flanges 11, fixed to the inner faces of the disks by rivets 12. The collars are adapted to be held against rotation on the shaft by keys 13 positioned in key-ways in the collar and shaft, and set screws 14 are screw-threadedly engaged in the collars for bearing against the keys to lock the collars on the shaft. The disks are adapted to be moved along the shaft for positioning adjacent the inner walls of the housing, and openings 15 in the housing walls receive the opposite ends of the shaft, bearing members 16 being fixed to the outer faces of the walls by rivets 17 in registry with said openings 15 for reinforcing the walls for support of the shaft.

Fixed to a protruding end of the shaft is a sprocket 18 over which a chain 19 runs to a suitable actuating means (not shown) and rotatable guide sprockets 20 and 21 are provided suitably supported from frame members, for example by supplemental brackets, such as 22 fixed to the frame member 4, for retaining the chain in engagement with the shaft sprocket 18 and for leading the chain to the actuating means.

Figure 2:
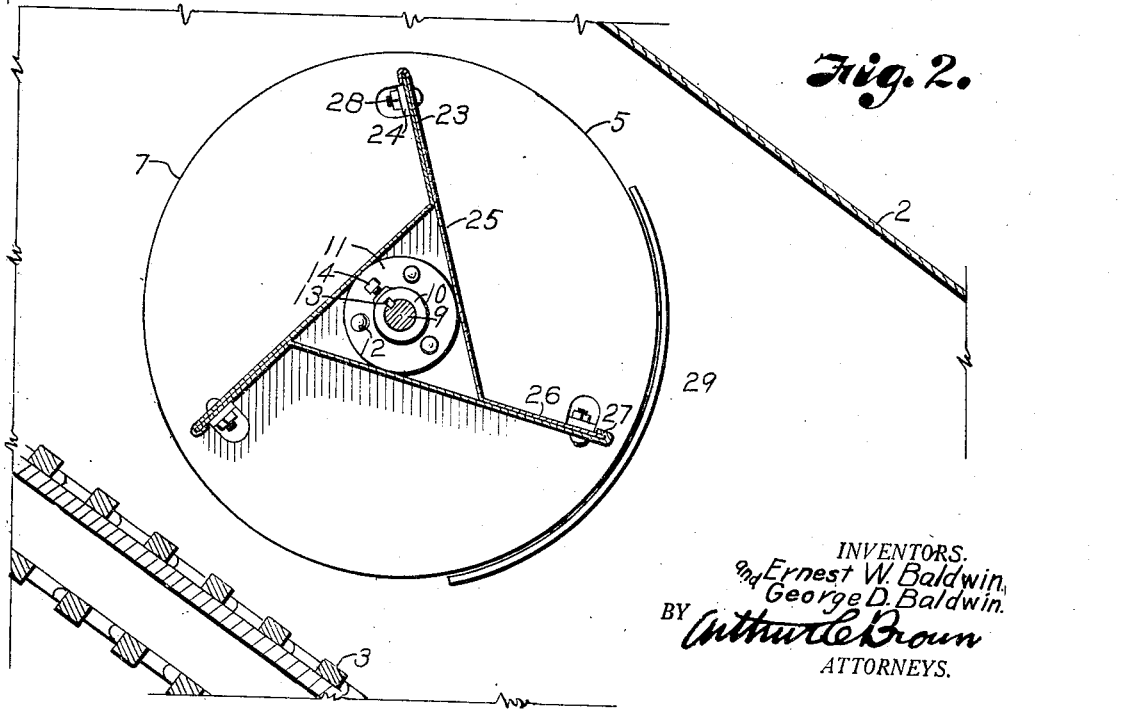
Fig. 2 is a vertical sectional view of the beater illustrating the relation of the blades and the relation of the beater to the conveyor.

Extending between the disks are blades 23 having their outer ends engaged with ears 24 instruck from the disks, the said outer ends extending across the disks on chords thereof and being engaged with the flanges of the collars whereby the blades are spaced from the shaft. Each blade comprises a body portion 25 which extends from adjacent the peripheries of the disks beyond the aligned axes thereof and a wing portion 26 extending at an obtuse angle from the body portion, the outer longitudinal edges of the body portion and wing portion of a blade being substantially equally spaced from the shaft. The outer end of the body portion of one blade is positioned in surface contact with the wing of an adjacent blade and each body portion is provided with a longitudinal edge hook 27 comprising a back-bent portion of the blade for overlying the longitudinal edge of the wing of said adjacent blade, as illustrated in Figs. 2 and 3. The blades are attached to the disks by bolts 28 that extend through the engaged and surface-contacting wing and body of adjacent blades and through the ears 24 instruck from the disk. In the preferable structure illustrated, three blades are provided whereby each of the blades is directly connected to each of the others, and the plane of a body portion of a blade intersects the plane of an adjacent blade.

Semi-circular shields 29 are attached to the housing to exclude straw from the space between the disks and the housing.

In mounting the device, the shaft is inserted through one of the openings of the housing, threaded through the collars fixed to the disks, and moved to pass through the opposite opening of the housing, said openings having been provided with the reinforcing journal members. The disks are fixed to the shaft in positions suitable for desired spacing from the inner faces of the housing walls, and the blades are installed the edges of one blade engaging the wing of the adjacent blade, and the blades are fixed on the disks by the bolts extending through the instruck ears of the disks.

The sprockets and chains being provided, a beater so constructed and installed in suitable relation to the conveyor is operable by the chain shown from a suitable source.

The structure illustrated provides for a box-like, three-sided casing surrounding the shaft, the blades extending in the planes of the casing walls, and on each side of the shaft. The angularly extending wings of the blades tend to prevent the setting-up of air currents, and the angular relations of the blades to the conveyor during the rotation of the beater is such that the fanning effect due to substantially radial blades is avoided.

What we claim and desire to secure by Letters Patent is:

1. In a device of the character described, a plurality of blades, each including a flat body portion intersecting the extended diameter of a central axis, the body portion of each blade having a back-turned hook at its outer edge forming a socket and a wing on its inner edge engaging the rear face of the body portion of an adjacent blade and retained in the socket thereof.

2. In combination with a shaft and spaced collars fixed on said shaft, a plurality of blades each including a body portion having tangential bearing on the collars and wings on the inner edges of said body portions engaging the rear faces of the body portions of adjacent blades, the body portions having hooks at their outer edges engaging the wings of adjacent blades to form a rigid structure.

3. In combination with a shaft, spaced, flanged collars fixed on the shaft, disks fixed on the outer faces of the collar flanges, blades, each including a body portion having tangential bearing on the collar flanges and having wings on their inner edges bearing against the rear face of the body portion of an adjacent blade, means securing the wings to the body portions, and means securing the blades to the disks.

4. In combination with a shaft, spaced, flanged collars fixed on the shaft, disks fixed on the outer faces of the collar flanges, blades, each including a body portion having tangential bearing on the collar flanges and having wings on their inner edges bearing against the rear face of the body portion of an adjacent blade, means securing the wings to the body portions, ears on the disks and means securing the blades to the ears.

5. In a device of the character described, a beater comprising spaced disks, blades having body portions extending across the disks on cords thereof and having angularly extending portions engaging the body portions of an adjacent blade, and hook-shaped flanges on the blades for engaging over the angular portion of an adjacent blade.

In testimony whereof we affix our signatures.

ERNEST W. BALDWIN.
GEORGE D. BALDWIN.